US009600505B2

(12) United States Patent
Kemmler

(10) Patent No.: US 9,600,505 B2
(45) Date of Patent: Mar. 21, 2017

(54) CODE OPTIMIZATION BASED ON CUSTOMER LOGS

(71) Applicant: Andreas Kemmler, Bönnigheim (DE)

(72) Inventor: Andreas Kemmler, Bönnigheim (DE)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 14/493,597

(22) Filed: Sep. 23, 2014

(65) Prior Publication Data

US 2016/0085529 A1 Mar. 24, 2016

(51) Int. Cl.
G06F 17/30 (2006.01)
G06F 9/445 (2006.01)
G06F 9/45 (2006.01)

(52) U.S. Cl.
CPC .... G06F 17/30306 (2013.01); G06F 9/44589 (2013.01)

(58) Field of Classification Search
CPC .... G06F 8/443; G06F 17/30306; G06F 11/34; G06F 11/3409
USPC ......................................................... 717/159
See application file for complete search history.

(56) References Cited

U.S. PATENT DOCUMENTS

| 6,622,298 | B1* | 9/2003 | Stamm | G06F 11/3684 714/E11.208 |
| 8,590,039 | B1* | 11/2013 | Muttik | H04L 63/1416 726/22 |
| 9,111,030 | B1* | 8/2015 | Dunn | G06F 11/36 |
| 2005/0257086 | A1* | 11/2005 | Triou, Jr. | G06F 11/3688 714/25 |
| 2007/0168343 | A1* | 7/2007 | Best | G06F 17/30675 707/E17.075 |
| 2007/0198445 | A1* | 8/2007 | Zen | G06N 7/005 706/15 |
| 2007/0220370 | A1* | 9/2007 | Branda | G06F 11/3688 714/49 |
| 2008/0184206 | A1* | 7/2008 | Vikutan | G06F 11/3688 717/127 |
| 2009/0235059 | A1* | 9/2009 | Moyer | G06F 9/30076 712/227 |
| 2012/0030515 | A1* | 2/2012 | Birakoglu | G06F 11/368 714/38.1 |
| 2012/0072423 | A1* | 3/2012 | Morrison | G06F 11/3466 707/739 |
| 2012/0151453 | A1* | 6/2012 | Finking | G06F 11/3624 717/130 |

(Continued)

OTHER PUBLICATIONS

Pacheco et al., "Feedback-directed Random Test Generation", IEEE, 2007, 10pg.*

(Continued)

Primary Examiner — Ryan Coyer
(74) Attorney, Agent, or Firm — Buckley, Maschoff & Talwalkar LLC

(57) ABSTRACT

A system includes reception of a plurality of findings output by runtime checks executed by a plurality of computing systems, determination of whether a first one of the findings is a duplicate of an already-stored finding, storage, in a case it is determined that the first finding is not a duplicate of an already-stored finding, of the first finding in association with a finding identifier, and generation of a message including the finding identifier and information describing a problem associated with the finding.

15 Claims, 6 Drawing Sheets

(56) References Cited

U.S. PATENT DOCUMENTS

2014/0325486 A1* 10/2014 Zhang .................. G06F 11/3692
717/125
2014/0331212 A1* 11/2014 Gaikwad ............ G06F 11/3684
717/131

OTHER PUBLICATIONS

Perry, Dewayne E., "The Inscape Environment", ACM, 1989, 11pg.*
Wasserman et al., "Software Reliability via Run-Time Result-Checking", ACM, 1997, 24pg.*
Xie et al., "Rostra: A Framework for Detecting Redundant Object-Oriented Unit Tests", IEEE, 2004, 10pg.*
Fu et al., "Exception-chain Analysis: Revealing Exception Handling Architecture in Java Server Applications", IEEE, 2007, 10pg.*
Hovemeyer et al., "Finding More Null Pointer Bugs, But Not Too Many", ACM, 2007, 6pg.*
Xu et al., "Detecting Large-Scale System Problems by Mining Console Logs", ACM, 2009, 15pg.*
Nicol, Daniel, "The EWA workflow—a closer look", Solution Manager—SCN Wiki, Mar. 7, 2013, downloaded Sep. 23, 2014, retrieved from http://wiki.scn.com/wiki/display/SM/The+EWA+workflow+-+a+closer+look, 3pgs.
Kaestner, Christopher, "Getting Started with the ABAP Test Cockpit for Developers", Version 1, SCN, Oct. 19, 2012, downloaded Sep. 23, 2014, retrieved from http://SCN.SAP.Com/docs/DOC-32628, 6pgs.

* cited by examiner

CODE OPTIMIZATION BASED ON CUSTOMER LOGS

BACKGROUND

According to conventional database architectures, a client application interacts with an application executing on an application server. In response to requests received from the client application, the application acquires stored data from an underlying database system, performs any necessary processing, and provides a response to the client application.

Recently-developed database architectures integrate transaction-based (e.g., Online Transaction Processing) and analytics-based (e.g., Online Analytical Processing) processing with the underlying database system. These architectures support execution of applications within the database system (i.e., without the need of an application server). These database systems may support existing database programming languages, but some existing application code in certain programming languages may need to be adapted in order to perform as intended.

The aforementioned database systems may implement an in-memory database, whose high-performance processing allows performance-critical portions of business logic to be executed at the database level. An in-memory database may utilize columnar data storage, and existing application code may benefit from optimizations which leverage such columnar storage.

Adaptation and/or optimization of application code for execution in conjunction with databases may proceed via manual analysis or using static code-analyzing tools. Such approaches are unsatisfactory, in view of the typical enormous number of source code lines and the use of dynamic coding. Moreover, static code-analyzing tools exhibit a high rate of false positives, which eventually require manual analysis. Runtime checks are more efficient and effective, but it is not possible to cover all portions of code and every business aspect with such checks.

DETAILED DESCRIPTION

The following description is provided to enable any person in the art to make and use the described embodiments and sets forth the best mode contemplated for carrying out some embodiments. Various modifications, however, will remain readily apparent to those in the art.

Briefly, some embodiments operate to transfer the logs of checks running in several disparate deployed systems to a central repository and to optimize application code based on the logs.

Figure 1:
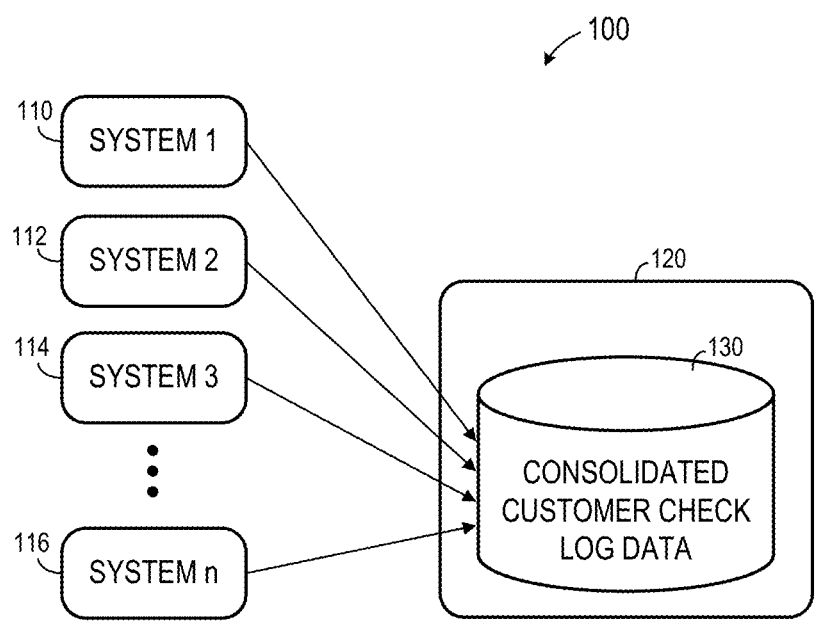
FIG. 1 is a block diagram of a system to collect customer logs.

FIG. 1 is a block diagram of system 100. System 100 includes systems 110-116 and centralized system 120. Centralized system 120 includes storage device 130, which stores consolidated customer check log data.

Each of systems 110-116 is a computing system which executes application code. For example, system 112 may comprise a computing system executing a suite of business applications for an enterprise. At least a portion of the code of the business applications may be executed at the database level. Each of systems 110-116 may comprise a customer of a developer of the suite of business applications.

Each of systems 110-116 also executes runtime checks which analyze the corresponding system at runtime. These runtime checks may be provided by the developer of the application code or developed by the entities managing each of systems 110-116 (e.g., customer-specific checks). The runtime checks may be selectively activated within each of systems 110-116, and do not analyze application source code.

In one example, a runtime check executed by one of systems 110-116 records all events where a SELECT into an unsorted internal table without an ORDER BY clause or subsequent SORT is followed by specific statements that require the internal table to be sorted, such as AT NEW, AT END OF, AT FIRST, AT LAST, DELETE ADJACENT DUPLICATES FROM . . . , READ TABLE . . . BINARY SEARCH. This check may detect source code which may not work as expected. Every check record in the result view provides two source code positions: the position in which the SELECT statement is located and the position in which the statement which requires the internal table to be sorted occurs. The call stack of the latter is available via the corresponding context menu for the check record.

In another example, a runtime check records all events where the internal table itab in the clause . . . FOR ALL ENTRIES IN itab within a SELECT statement is empty. In such cases, the runtime engine might ignore the WHERE condition in the same SELECT statement. Consequently, all rows from the database table are returned in the result set of the SELECT statement. This is not the intended behavior in most cases.

The log data generated by the checks is transferred from systems 110-116 to system 120 according to any synchronous or asynchronous schedule. Each system 110-116 may transfer the log data according to its own respective schedule. According to some embodiments, no business data is transferred. Rather, the log data includes only metadata which is needed to understand the problem. According to some non-exhaustive examples, the metadata may specify activated functionality, memory usage, and support packages.

Figure 2:
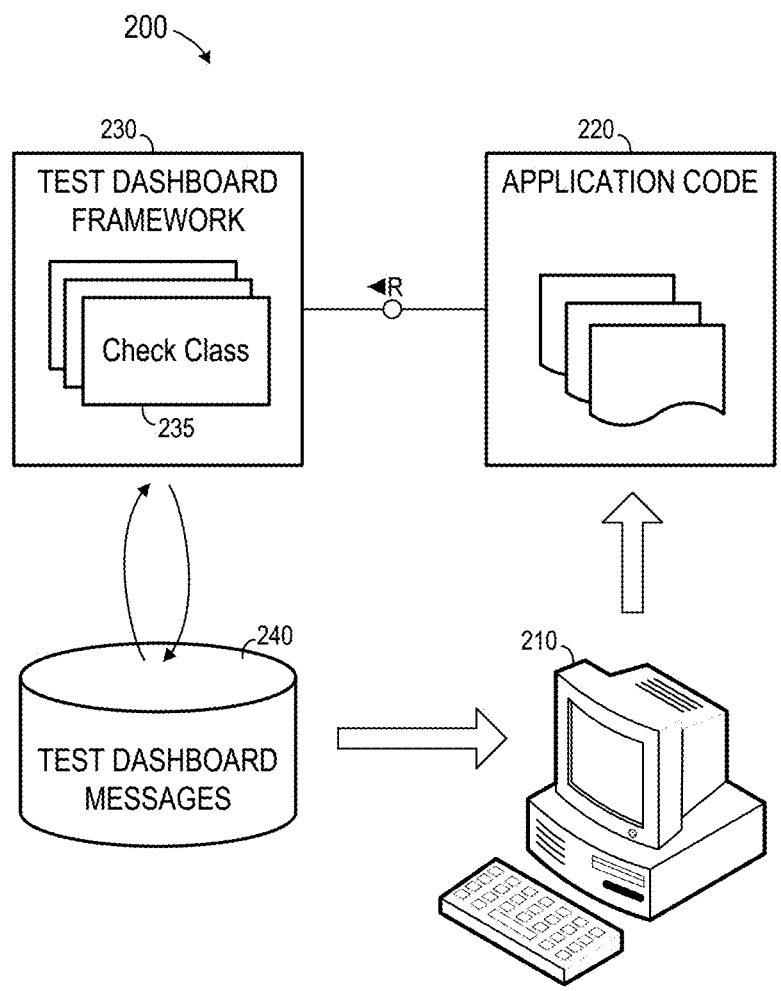
FIG. 2 is a block diagram of a system to test code.

FIG. 2 illustrates test system 200. A developer operates developer terminal 210 to create application code 220. Application code 220 is checked by check classes 235 executed within test dashboard framework. Check classes 235 comprise code which is designed to perform specific checks utilizing the runtime environment provided by framework 230.

Performance of the checks may result in creation of messages for storage among test dashboard messages 240. Messages 240 are made available to terminal 210, which may use the messages to inform modification of development code 220.

Figure 3:
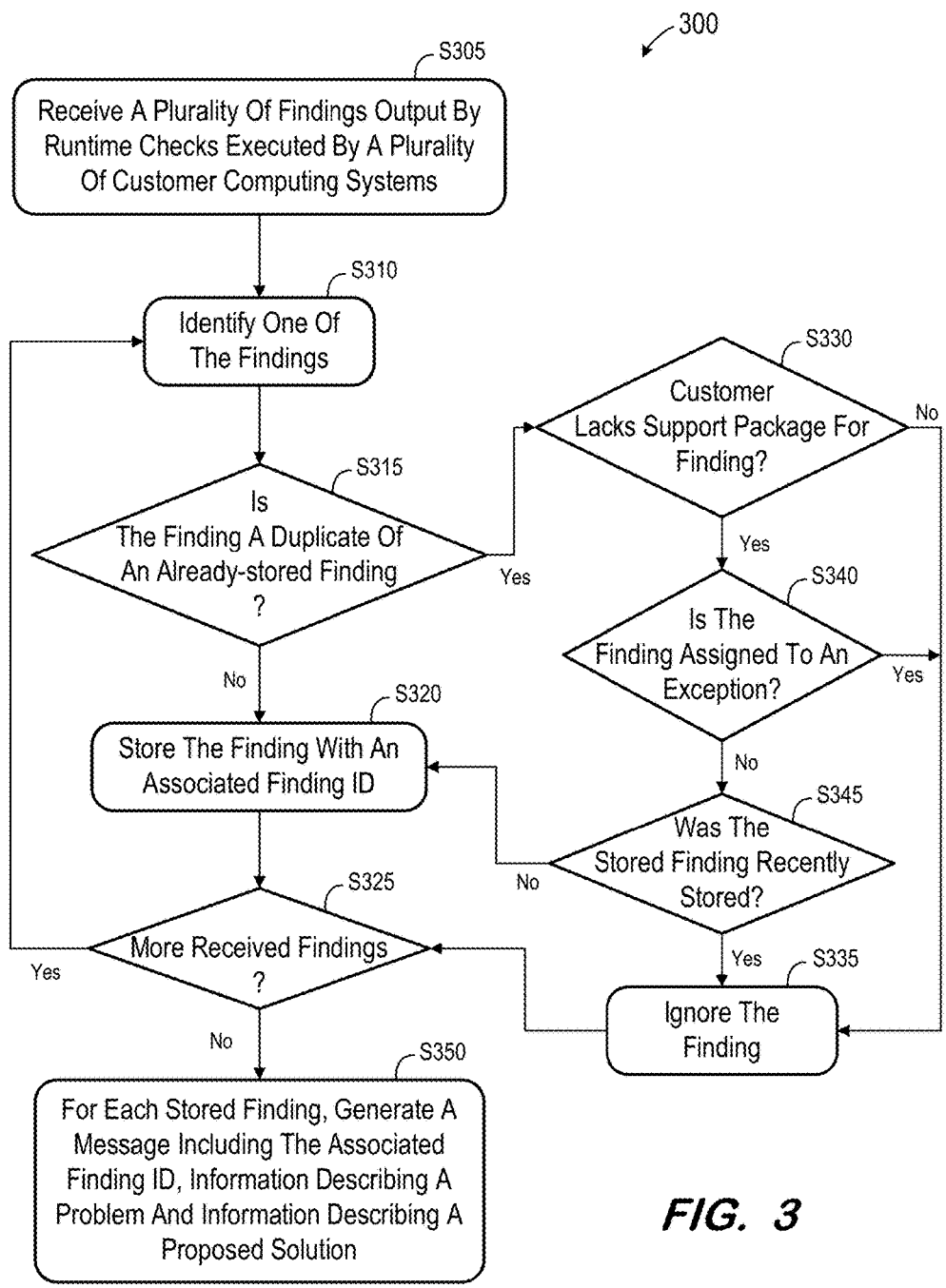
FIG. 3 is a flow diagram of a process according to some embodiments.

FIG. 3 comprises a flow diagram of process 300 according to some embodiments. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S305, a plurality of findings are received. The findings are output by runtime checks of customer computing systems. As used herein, a finding consists of any information describing a real or potential problem caused by application code. A finding may identify an error or an opportunity for code optimization.

Transmission of the findings may occur at any time or according to any schedule. For example, findings may be received at S305 whenever new findings are available and when previously-received findings have been completely processed according to process 300.

Figure 4:
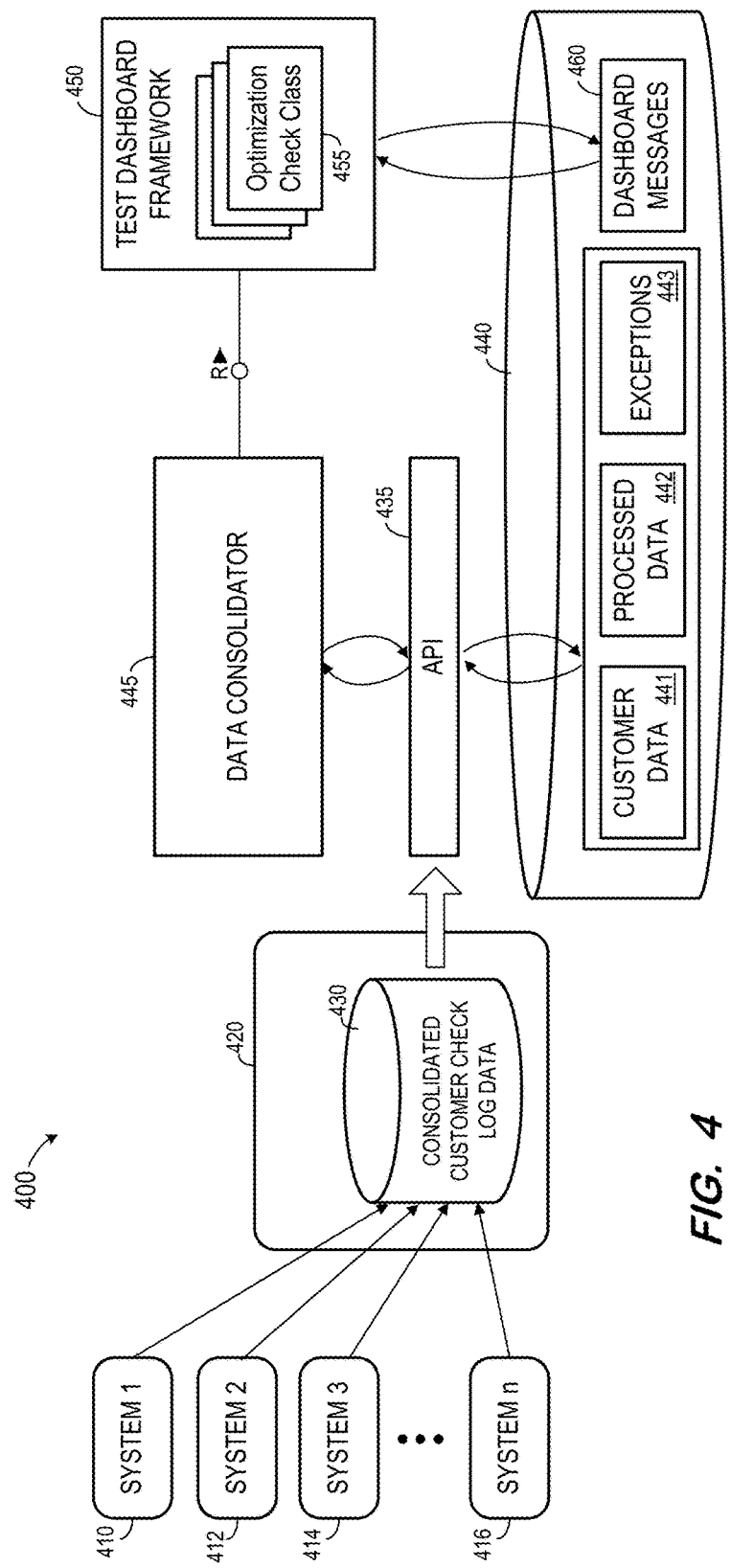
FIG. 4 is a block diagram of a system according to some embodiments.

FIG. 4 illustrates architecture 400. In some embodiments, various hardware elements of architecture 400 execute program code to perform process 300. For example, system 420 may receive a plurality of findings output by runtime checks executed by systems 410-416, as described above with respect to FIG. 1. Next, system 420 uses application programming interface 435 to transmit the findings, where they are received at S305 and stored in storage device 440 as customer data 441.

Application programming interface 435 implements a function: IMPORT_NEW_DATA. The function takes data available in storage device 430 and transfers it to tables of customer data 441. Any 'old' data within customer data 441 from previous transfers is overwritten.

One of the newly-received findings is identified in S310. For example, a first finding of customer data 441 may be identified in S310. Next, at S315, it is determined whether the identified finding is a duplicate of an already-stored finding. In this regard, as will be further understood from the description below, tables of processed data 442 store findings which have previously been received. If the finding identified at S310 is not a duplicate of a finding stored in processed data 442, the finding is stored in processed data 442, along with an associated finding ID. Flow then proceeds to S325 to determine whether any other findings which were received at S305 remain in customer data 441. If so, flow returns to S310 to identify another finding.

If it is determined at S315 that an identified finding is a duplicate of an already-stored finding, flow proceeds to S330. At S330, it is determined whether the finding has been addressed by a support package. For example, the record of the existing finding in processed data 442 may indicate that a correction for the existing finding has already shipped with a certain support package. If so, it is also determined whether the customer associated with the finding (of customer data 441) has this support package. If not, e.g., due to a low level or expired service agreement, flow proceeds to S335 to ignore the finding, and on to S325.

Flow proceeds from S330 to S340 if the duplicate finding has not been addressed by a support package, or if it has been addressed by a support package of the associated customer. At S340, it is determined whether the finding is assigned to an exception. In this regard, exceptions table 443 associates exceptions with various finding IDs. An exception associated with a particular finding ID may indicate that the finding is not relevant and the new duplicate finding should be ignored. The ability to record exceptions may be useful in case that a runtime check reports false positive findings, where no correction is needed. Flow proceeds to S335 to ignore the finding of customer data 441 if the corresponding duplicate finding of processed data 442 is assigned to an exception.

Alternatively, if the corresponding duplicate finding of processed data 442 is not assigned to an exception, it is determined at S345 whether the finding was recently stored in processed data 442. If so, the finding may still be in the process of being addressed, and therefore it is not necessary to store the newer duplicate finding in processed data 442. Flow therefore proceeds to S335.

If it is determined at S345 that the finding was not recently stored in processed data 442, the existing finding may be marked as 'outdated' in processed data 442 and flow returns to S320. As described above, S320 includes storage of the new finding and an associated finding ID in processed data 442.

Flow continues to cycle among S310 through S345 as described above until it is determined at S325 that no more received findings of customer data 441 remain to be processed. At this point, a message is generated for each finding of processed data 442 which was stored at S320 (i.e., the newly-stored findings, and not the findings stored in processed data 442 prior to execution of process 300). For each stored finding, the generated message includes an associated finding ID, information describing a problem, and information describing a proposed solution.

According to some embodiments, data consolidator 445 passes a newly-stored finding of processed data 442 to test dashboard framework 450. Optimization check class 455 executes a check of the finding within the framework and generates a message at S350 based on the results of the check. The message is stored among dashboard messages 460. The foregoing process repeats for each newly-stored finding.

Figure 5:
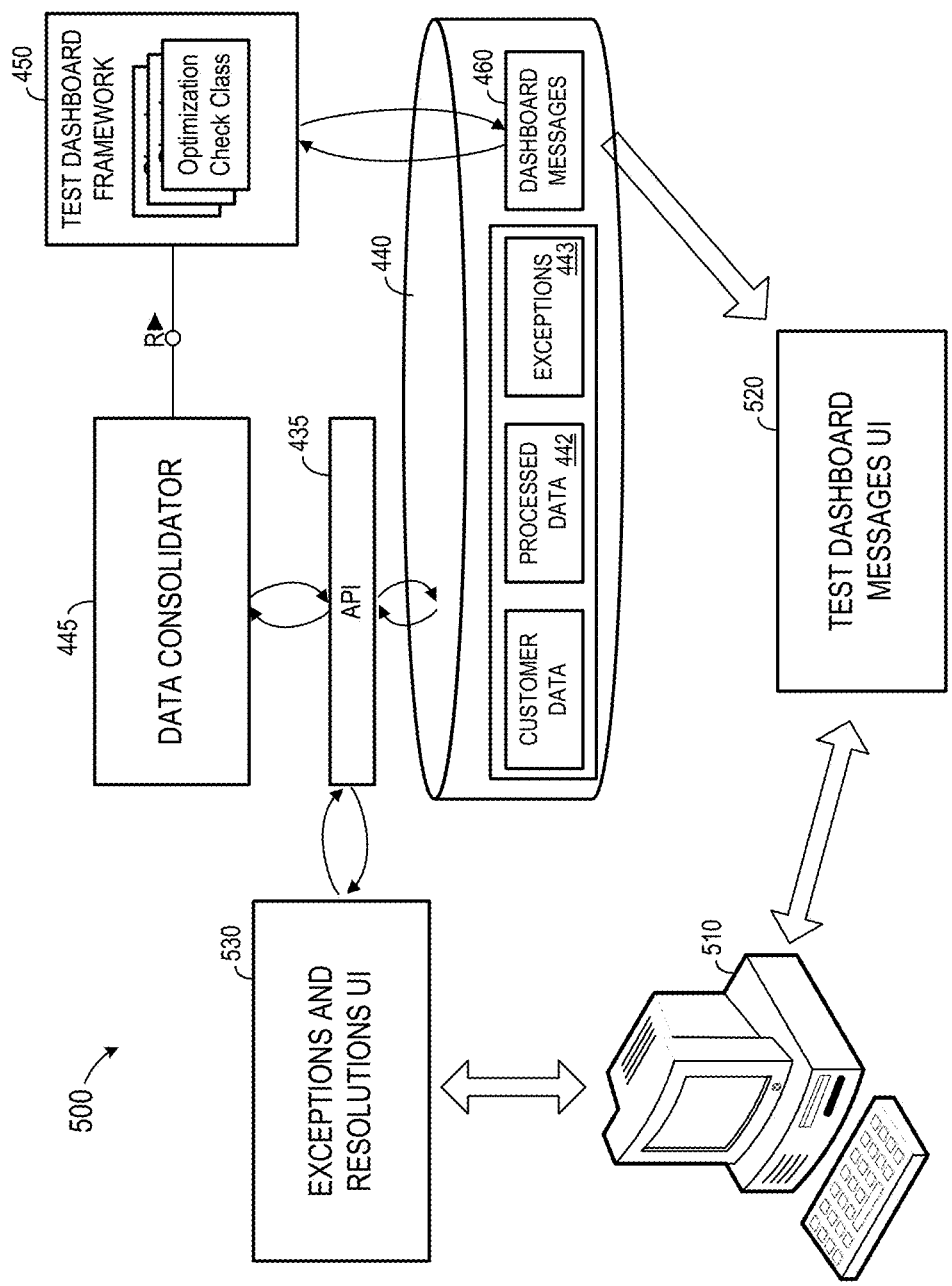
FIG. 5 is a block diagram of a system according to some embodiments.

FIG. 5 illustrates system 500 for processing dashboard messages 460 according to some embodiments. Elements 440 through 460 may be implemented and may operate as described above with respect to FIG. 4. Interfaces 520 and 530 may be provided by program code of a development application which also provides data consolidator 445 and test dashboard framework 450. In some embodiments, computing device 510 executes a Web browser to request interfaces 520 and 530 from a Web server (unshown).

A developer may operate computing device 510 to access test dashboard messages user interface 520. Test dashboard messages user interface 520 displays the dashboard messages generated at S350. If the developer implements a software optimization or other correction based on one of the messages, the developer accesses exceptions and resolutions user interface 530 to input an identifier of the optimization/correction and an identifier of a support package including the optimization/correction. This identifiers are stored in processed data table 442 via API 435 in association with the finding based on which the message was generated. In this regard, each message may include a finding ID of the finding based on which the message was generated.

Similarly, if the developer reviews a message in user interface 520 and determines that the message need not be addressed, the developer accesses exceptions and resolutions user interface 530 to input an exception for the message. An indication of the exception is stored in exceptions table 443 in association with the finding based on which the message was generated, using the finding ID specified in the message.

According to some embodiments, once a correction or optimization is implemented and offered to customers (e.g., via instructions and/or via a support package) and the correction/optimization begins to be applied to customer systems 410-416, the number of received findings associated with the correction/optimization will decrease. Once the correction/optimization is applied to all customer systems 410-416, the associated findings should cease to be received.

Figure 6:
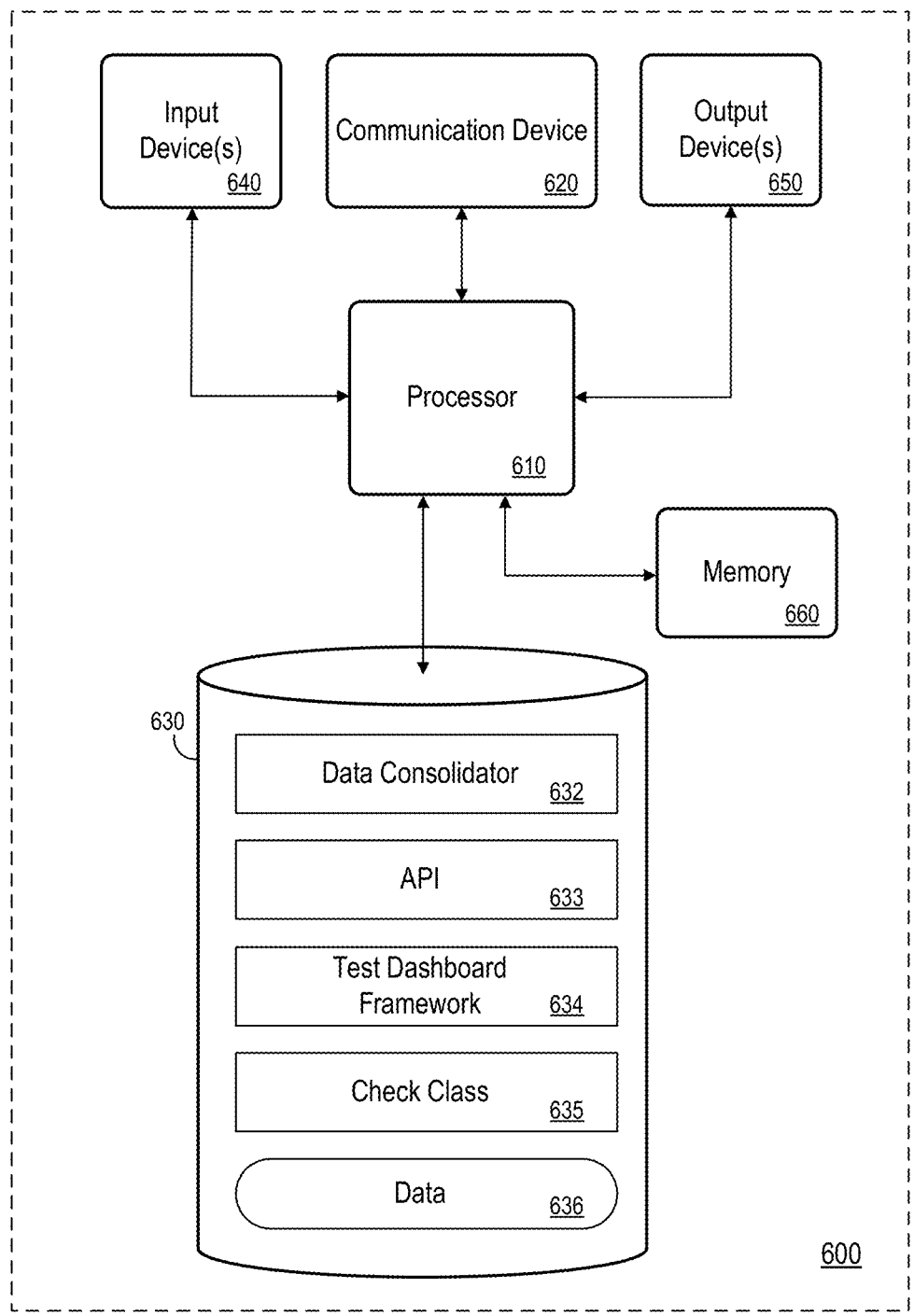
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Each of data consolidator 632, API 633, test dashboard framework 634, and check class 635 may comprise program code executed by processor 610 to cause apparatus 600 to perform any one or more of the processes described herein. Embodiments are not limited to execution of these processes by a single apparatus. Data 636 may comprise one, some or all of customer data 441, processed data 442, exceptions 443 and dashboard messages 460, as described above. Data storage device 630 may also store data and other program code needed for providing database functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a computing device comprising:
      a memory storing processor-executable program code; and
      a processor to execute the processor-executable program code in order to cause the computing device to:
         receive a plurality of findings output by runtime checks executed by a plurality of computing systems;
         determine that a first finding is a duplicate finding of an already-stored finding;
         determine whether the first finding should be ignored by determining whether the already-stored finding has been at least one of addressed by a correction and assigned to an exception;
         in response to determining that the already-stored finding has not been addressed by a correction or assigned to an exception, determine whether the already-stored finding was stored within a predetermined period of time with respect to a current time; and
         in response to determining that the already-stored finding was not stored within the predetermined period of time, determine that the first finding should not be ignored, store the first finding in association with a finding identifier, and generate a message including the finding identifier and information describing a problem associated with the first finding.

2. A system according to claim 1, wherein the message further comprises information describing a solution to the problem.

3. A system according to claim 1, wherein the determining whether the already-stored finding has been at least one of addressed by a correction and assigned to an exception comprises determining whether the already-stored finding has been assigned to an exception based on indications of exceptions stored in an exceptions table; and
   in response to determining that the already-stored finding has not been assigned to an exception, determining that the first finding should not be ignored.

4. A system according to claim 1, wherein, in response to determining that the already-stored finding has not been at least one of addressed by a correction and assigned to an exception, the determining further comprises determining whether the already-stored finding was stored within a predetermined period of time with respect to a current time; and
   in response to determining that the already-stored finding was not stored within the predetermined period of time, determining that the first finding should not be ignored.

5. A system according to claim 1, further comprising:
   a second computing device comprising:
      a second memory storing second processor-executable program code; and
      a second processor to execute the second processor-executable program code in order to cause the second computing device to:
         receive the message;
         present the message;

receive a first identifier of a code change and a second identifier of a support package including the code change; and store the first identifier and the second identifier in association with the finding identifier.

6. A non-transitory computer-readable medium storing program code, the program code executable by a processor of a computing system to cause the computing system to:

receive a plurality of findings output by runtime checks executed by a plurality of computing systems;

determine that a first finding is a duplicate finding of an already-stored finding;

determine whether the first finding should be ignored by determining whether the already-stored finding has been at least one of addressed by a correction and assigned to an exception;

in response to determining that the already-stored finding has not been addressed by a correction or assigned to an exception, determine whether the already-stored finding was stored within a predetermined period of time with respect to a current time; and in response to determining that the already-stored finding was not stored within the predetermined period of time, determine that the first finding should not be ignored, store the first finding in association with a finding identifier, and generate a message including the finding identifier and information describing a problem associated with the first finding.

7. A medium according to claim 6, wherein the message further comprises information describing a solution to the problem.

8. A medium according to claim 6, wherein the determining whether the already-stored finding has been at least one of addressed by a correction and assigned to an exception comprises determining whether the already-stored finding has been assigned to an exception based on indications of exceptions stored in an exceptions table; and in response to determining that the already-stored finding has not been assigned to an exception, the computer system determines that the first finding should not be ignored.

9. A medium according to claim 6, wherein, in response to determining that the already-stored finding has not been at least one of addressed by a correction and assigned to an exception, the method further comprises determining whether the already-stored finding was stored within a predetermined period of time with respect to a current time; and in response to determining that the already-stored finding was not stored within the predetermined period of time, determining that the first finding should not be ignored.

10. A medium according to claim 6, wherein the program code is further executable by a processor of a computing system to cause the computing system to:

receive the message;
present the message;

receive a first identifier of a code change and a second identifier of a support package including the code change; and store the first identifier and the second identifier in association with the finding identifier.

11. A computer-implemented method comprising:

receiving a plurality of findings output by runtime checks executed by a plurality of computing systems;

determining that a first finding is a duplicate finding of an already-stored finding;

determining whether the first finding should be ignored by determining whether the already-stored finding has been at least one of addressed by a correction and assigned to an exception;

in response to determining that the already-stored finding has not been addressed by a correction or assigned to an exception, determine whether the already-stored finding was stored within a predetermined period of time with respect to a current time; and in response to determining that the already-stored finding was not stored within the predetermined period of time, determine that the first finding should not be ignored, store the first finding in association with a finding identifier, and generate a message including the finding identifier and information describing a problem associated with the first finding.

12. A method according to claim 11, wherein the message further comprises information describing a solution to the problem.

13. A method according to claim 11, wherein the determining whether the already-stored finding has been at least one of addressed by a correction and assigned to an exception comprises determining whether the already-stored finding has been assigned to an exception based on indications of exceptions stored in an exceptions table; and in response to determining that the already-stored finding has not been assigned to an exception, determining that the first finding should not be ignored.

14. A method according to claim 11, further comprising:

in response to determining that the already-stored finding has not been at least one of addressed by a correction and assigned to an exception, determining whether the already-stored finding was stored within a predetermined period of time with respect to a current time; and in response to determining that the already-stored finding was not stored within the predetermined period of time, determining that the first finding should not be ignored.

15. The system of claim 1, wherein the determining whether the already-stored finding has been addressed by at least one of a correction and an exception comprises determining whether the already-stored finding has been addressed by a support package; and in response to determining that the already-stored finding has not been addressed by a support package, determining that the first finding should not be ignored.

* * * * *